United States Patent [19]

DuRocher

[11] 4,142,083
[45] Feb. 27, 1979

[54] APPARATUS AND METHOD FOR TERMINATING ELECTRICAL CONDUCTORS

[75] Inventor: Gideon A. DuRocher, Mount Clemens, Mich.

[73] Assignee: Essex Group, Inc., Fort Wayne, Ind.

[21] Appl. No.: 771,441

[22] Filed: Feb. 24, 1977

[51] Int. Cl.$^2$ .............................................. B23K 9/00
[52] U.S. Cl. ................................. 219/58; 219/137 R; 219/161; 228/904
[58] Field of Search ................... 219/137 R, 161, 160, 219/58, 6, 901, 56.22; 228/222, 904; 338/51

[56] References Cited

U.S. PATENT DOCUMENTS

| | | | |
|---|---|---|---|
| 458,176 | 8/1891 | Lemp | 219/161 |
| 481,781 | 8/1892 | Carpenter | 338/51 |
| 3,029,494 | 4/1962 | Andren | 29/628 |
| 3,089,950 | 5/1963 | Elchyshyn | 219/160 |
| 3,743,815 | 7/1973 | Woods | 219/161 X |
| 3,826,000 | 7/1974 | Durocher | 219/137 X |
| 4,091,259 | 5/1978 | Tanaka | 219/58 |

OTHER PUBLICATIONS

Mullins, "Understanding Capacitors", Sams & Co. 1961, N.Y., pp. 79 & 80.

Primary Examiner—E. A. Goldberg
Attorney, Agent, or Firm—Learman & McCulloch

[57] ABSTRACT

The disclosure herein relates to the formation of a solid bead at either or both ends of an insulated conductor, the opposite ends of the conductor having been stripped of insulation prior to beading of the ends. The beading is accomplished by heating the conductor to its liquification temperature while the conductor is in a horizontal position and prepares the end or ends of the conductor for assembly with terminals without necessitating twisting or soldering operations. To protect the insulator jacket during heating a heat sink is applied to the bare conductors during heating.

12 Claims, 5 Drawing Figures

APPARATUS AND METHOD FOR TERMINATING ELECTRICAL CONDUCTORS

This invention relates to the provision of solid terminations at one or both ends of an insulated electrical conductor formed of multiple strands of wire.

In the manufacture of electrical conductors it is conventional to withdraw insulation covered wire from a coiled supply, cut the wire into predetermined lengths, strip the insulation from one or both ends of the conductor, and prepare one or both ends of the conductor for the application of terminals or the like. In many instances the conductor is formed of a plurality of strands of fine wire which have a tendency to separate upon assembly of the bared end of the conductor with a terminal or the like. To overcome this undesirable tendency, it is common practice to spray or dip the bared end of the conductor with a solder flux, following which the ends of the wire strands are soldered together, thereby preventing their separation.

The soldering procedure referred to above has many disadvantages. For example, provision must be made for the supply and application of the flux and the solder, as well as the installation of equipment for venting vaporized flux. In addition, it is not uncommon for flux, solder, or both, to be applied to the insulation adjacent the bared end of the conductor, thereby frequently necessitating recutting and restripping of the conductor, together with resoldering of the strands so as to provide sufficient uniformity among all conductors to enable them to be united with terminals or the like. Further, the heat from the soldering operation often causes the insulation to shrink, thereby necessitating recutting of the conductor to prevent its bared portion being too long. The cost of flux and solder, as well as the cost of wire and insulation lost in the recutting and restripping operations, is substantial, even in only one conductor manufacturing facility when it is considered that such facility can produce many millions of conductors in as short a period of time as one month.

Methods and apparatus according to the invention avoid the disadvantages of conventional termination processes by heating the bared end of the conductor at least to the liquification temperature of the conductive material and maintaining that temperature for a sufficient period of time to cause the end of the conductor to form a solid bead or nodule, thereby uniting all of the strands of which the conductor may be formed. The insulation adjacent the bared end of the conductor is protected by means of heat conductive clamping means which not only positions the bared end of the conductor properly for beading, but also conducts heat away from the conductor.

Apparatus and methods according to the invention are disclosed in the following description and in the accompanying drawings, wherein.

Apparatus constructed in accordance with the disclosed embodiment of the invention is adapted for use with a conventional machine for cutting elongate, insulated wire stock into successive conductors of predetermined length, stripping the insulation from one or both ends of the conductors, and conveying the conductors successively past terminal application stations at which terminals are applied to the bared ends of the conductors. One such machine is disclosed in U.S. Pat. No. 3,029,494 and to which reference may be had for a more complete description of its construction and operation. Such machine includes a pair of spaced apart, parallel, endless conveyor bands or chains 1 and 2 having movable jaw devices 3 and 4 which grip adjacent ends of insulated conductors 5 and advance them intermittently along a horizontal path.

Figure 1:
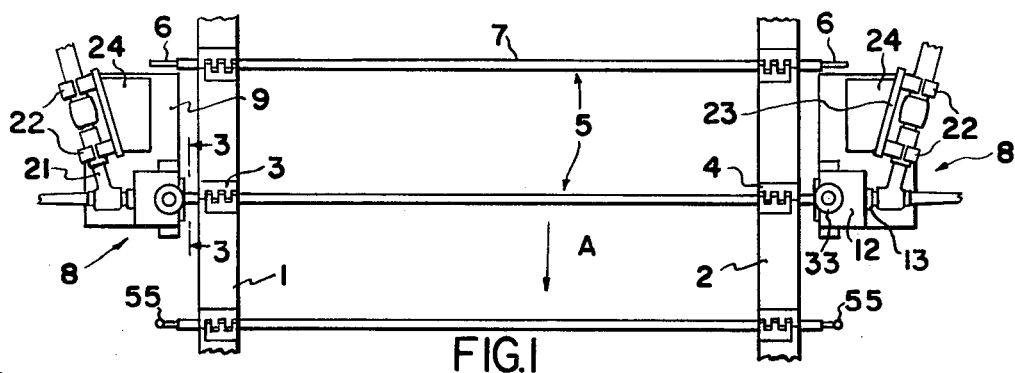
FIG. 1 is a fragmentary, top plan view of a typical installation equipped with bead-forming apparatus constructed according to the invention.

Each conductor 5 shown in FIG. 1 is supported by the conveyor in a horizontal position and comprises a length of filamentary or stranded wire 6 encircled by a jacket 7 of insulation, the insulation having been stripped from adjacent ends of the conductor so that opposite ends of the wire 6 are bared. The length of each conductor 5 is such that the jacket 7 projects beyond both of the conveyor bands 1 and 2, and the bared ends of the wire project even farther beyond the conveyor bands.

The movements of the conveyor are controlled in the manner disclosed in the aforementioned patent so as to index or move the conductors 5 step-by-step in the direction of the arrow A in FIG. 1. Each conductor 5, therefore, has a certain dwell period between indexing movements of the conveyors, thus enabling each conductor in succession to be positioned momentarily with its ends confronting a pair of similar heating devices 8 positioned alongside the respective conveyor bands 1 and 2 and forming heating stations.

Each heating device 8 comprises a base 9 fixed on a supporting frame 10 outboard of the conveyor, the base supporting an upstanding bracket 11 provided at its upper end with an arm 12 which extends toward the adjacent conveyor band. The bracket 11 has an opening therein through which extends a housing 13 terminating at one end in a nozzle 14. Supported by the housing 13 is a preferably tungsten electrode 15 connected by wiring 16 to a conventional arc welding machine 17. The machine 17 is connected to a source 18 of electrical energy through a switch 19 and a known adjustable timer 20. The switch 19 normally is open, but is adapted to be closed by a cam or other suitable means (not shown) on the associated conveyor band 1, 2 as each successive conductor 5 is positioned at the heating station.

The housing 13 is supported at one end of an arm 21 that is held in clamps 22 mounted on an upstanding bracket 23 having a lower flange 24 which rests upon the base 9 and is adjustable relative thereto by bolts 25 which are accommodated in slots 26. The bolts and slots could be replaced by any other suitable adjustable mechanism which will permit adjustment of the housing 13 longitudinally of the electrode 15 for a purpose presently to be explained.

The base 9 also supports a block 27 having a pair of upstanding flat ribs 28 spaced by grooves 29. The ribs 28 are closely adjacent the associated conveyor band 1, 2 and are located at such level as to underlie and provide support for the insulated end portions of the conductor 5.

The block 27 forms the stationary part of a clamp 30 having a vertically reciprocable head 31 joined at its upper end to one end of a piston rod 32 which extends into a pneumatic or hydraulic cylinder 33. The cylinder 33 is supported atop the bracket arm 12 and the latter is slotted to accommodate a fitting 34 through which the piston rod 32 extends, the fitting being fixed to an L-shaped bracket 35 that is adjustably mounted on the arm 12 by bolts 36 which extend through slots 37 formed in the bracket 35. The head 31 of the clamp 30 thus is adjustable toward and away from the electrode 15.

At the lower edge of the head 31 is a pair of spaced fingers 28a adapted to fit into the slots 29, each of the fingers having a V-shaped notch 28b for engaging the jacket 7 and positioning the conductor substantially in axial alignment with the electrode 15.

The head 31 of the clamp 30 is formed of heat conductive metal, the thermal conductivity of which is enhanced by the provision of a plurality of spaced apart, heat radiating fins or plates 31a of large surface area.

Figures 2, 3:
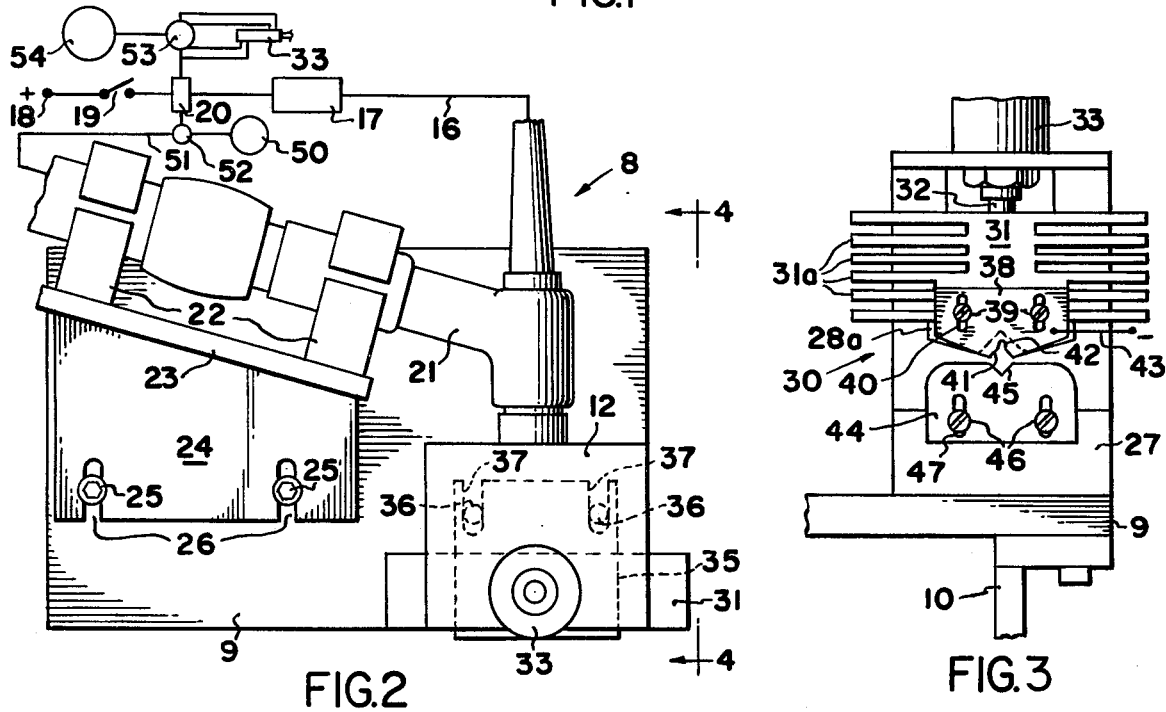
FIG. 2 is an enlarged, top plan view of the bead-forming apparatus illustrated at the left-hand end of FIG. 1.
FIG. 3 is a fragmentary, elevational view of the apparatus shown in FIG. 2 as viewed in the direction of the arrows 3—3 of FIG. 1.
Figures 4, 5:
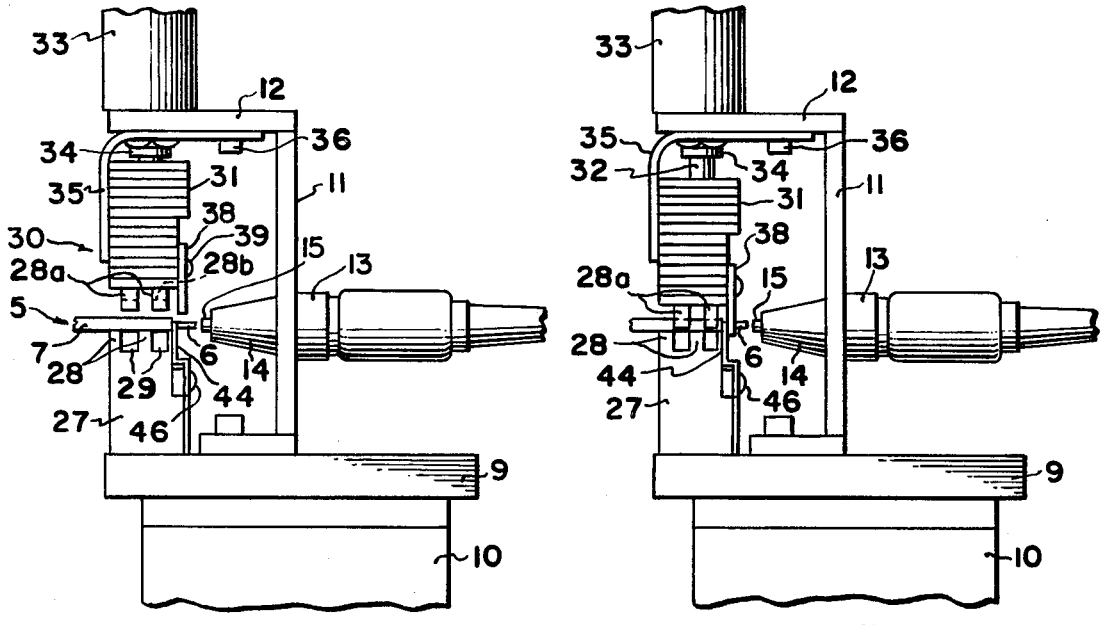
FIG. 4 is a fragmentary elevational view of the apparatus shown in FIG. 2 as viewed in the direction of the arrows 4—4.
FIG. 5 is a view similar to FIG. 4 but illustrating the apparatus in an adjusted position.

At that side of the head 31 which faces the electrode 15 is a wire gripping upper plate 38 formed of metal which is both thermally and electrically conductive, the plate being adjustably secured to the member 31 by bolts 39 which pass through slots 40 in the plate. The lower edge of the plate 38 is provided with a tapered throat 41 which communicates with a notch 42 having a semicircular base formed on a radius corresponding substantially to the radius of the wire 6. The plate 38 is electrically grounded as is indicated at 43 in FIG. 3.

The upper gripping plate 38 operates in conjunction with a lower gripping plate 44 having a V-shaped notch 45 in its upper edge. The plate 44 is adjustably mounted on the block 27 by bolts 46 which extend through slots 47. The notch 45 is of such size as to receive and support the bared end of the conductor 5 substantially in prolongation of the longitudinal axis of the electrode 15. The gripping plates 38 and 44 are removable so as to be replaced by others having different size notches adapted to accommodate filamentary conductors having diameters different from that of the wire 6.

In some instances it is desirable that the arc from the electrode be surrounded by an inert gas. For this purpose the arm 21 is provided with passages (not shown) communicating with the nozzle 14 and which may be supplied with an inert gas, such as argon, from a pressurized source 50 thereof through a conduit 51 in which is a valve 52 that is opened and closed in response to operation of the timer 20. The timer 20 also may control a valve 53 interposed between the cylinder 33 and a source 54 of pressurized fluid to effect clamping and unclamping movements of the clamp 30.

In the operation of the apparatus a conductor 5 having insulation 7 stripped from the opposite ends of the wire 6 will be transported by the conveyor to the heating station. Movement of the conveyor will be interrupted for a period of time so as to enable the conductor to be stationary at the heating station. When the conductor is at the heating station, each of the bared ends of the wire 6 will project beyond the sides of the conveyor a distance sufficient to enable the insulation 7 to rest upon the ribs 28 with the projecting bared wires 6 overlying the notch 45 in the gripping plate 44.

The housing 13 will have been adjusted to a position such that the end of the wire 6 is spaced from the electrode 15 a distance sufficient to sustain an arc between the electrode and the wire 6.

Upon closing of the switch 19, the timer 20 will be actuated so as to energize the cylinder 33 and move the clamp head 31 downwardly whereupon the notched fingers 28a will engage the insulation 7 to center the conductor with respect to the electrode 15. The gripping plate 38 will move downwardly with the head 31, and in overlapping relation with the plate 44, whereupon the end of the wire 6 will be seated in the notches 42 and 45 in substantial prolongation of the longitudinal axis of the electrode 15.

Actuation of the timer 20 will effect operation of the welding machine 17 so as to establish an arc between the electrode 15 and the confronting end of the wire 6. The welding machine will be so selected that the temperature of the arc will be sufficient to liquify the metal at the end of the wire 6 and the arc will be sustained for a period of time sufficient to liquify the metal. As the metal liquifies, surface tension will shape the molten metal into a bead or nodule 55 (FIG. 1) and the arc is maintained only for a period of time sufficient to form a bead which is little, if any, greater in diameter than that of the wire 6. Upon termination of the arc the molten metal will cool and solidify, thereby providing a solid metallic end for the wire 6, and all of the strands of the wire will terminate in the bead.

If the wire 6 is formed of copper, aluminum, or other conventional electrically conductive metals, it will have good heat conducting properties. Thus, the heat generated by the arc has a tendency to be conducted by the wire 6 toward the insulating jacket 7. Since the gripping plates 38 and 44 occupy positions between the end of the wire 6 and the end of the insulation, and since the clamp plates are formed of heat conductive material, and since the configuration of the notches 42 and 45 of the plates assures engagement of the plates with the wire around virtually the entire circumference of the latter, the great majority of the heat conducted by the wire 6 is transferred to the clamp plates, thereby avoiding any appreciable heating of the insulating jacket 7. Inasmuch as the gripping plate 38 overlaps the plate 44, the great majority of heat transferred from the wire 6 is conducted by the plate 38 to the finned head 31, thereby resulting in rapid radiation of the heat.

Following the lapse of a predetermined time, as determined by the timer 20, the valve 53 is actuated so as to energize the cylinder 33 and open the clamp 30, whereupon the conveyor may be actuated to advance the terminated conductor 5 and present another conductor to the heating station, whereupon the entire process is repeated.

It is not necessary, of course, that both ends of a conductor 5 be terminated at the heating station. Either end may be terminated according to the disclosed process if desired.

The disclosed apparatus and method are representative of presently preferred forms of the invention, but are intended to be illustrative rather than definitive thereof. The invention is defined in the claims.

I claim:

1. Apparatus for forming a bead at a free end of a filament projecting beyond an insulating jacket and composed of material capable of forming a bead when heated to its liquification temperature, said apparatus comprising heating means operable to heat said filament to its liquification temperature; means mounting said heating means at a heating station; means for transporting said filament to said heating station; filament positioning means mounted adjacent said heating station for engaging said jacket and positioning said filament at said heating station with said free end thereof exposed to said heating means; and means interposed between said positioning means and said heating means for gripping said filament at said heating station between said jacket and said free end, said gripping means being formed of heat conductive material.

2. Apparatus according to claim 1 wherein said positioning means supports said free end of said filament in a substantially horizontal position.

3. Apparatus according to claim 1 wherein said filament is composed of a plurality of strands of metallic material.

4. Apparatus according to claim 1 including means for moving said gripping means into and out of engagement with said filament.

5. Apparatus according to claim 1 wherein said gripping means is provided with heat radiating means.

6. A method of forming a bead at a free end of each of a plurality of filaments projecting beyond an insulating jacket and composed of material capable of forming a bead when heated to its liquification temperature, said method comprising the steps of moving a first one of said filaments to a heating station; engaging said jacket and positioning a free end of said one of said filaments at said station in a predetermined location; engaging said one of said filaments between said free end and said jacket with heat conductive means while said one of said filaments is in said location at said station; heating said free end of said one of said filaments at said station to a temperature and for a period of time sufficient to liquify the material of said filament at said free end; conducting heat from said filament via said heat conductive means during the heating of the free end thereof; terminating the heating of said free end of said one of said filaments following the formation of a liquified mass at said free end; cooling said mass to solidify said mass and form said bead; disengaging said jacket and said one of said filaments; and repeating said steps for each of the remaining filaments in succession.

7. A method according to claim 6 wherein each of said filaments is formed of metal.

8. A method according to claim 6 wherein each of said filaments has two free ends and wherein said steps are performed on both of said free ends.

9. A method according to claim 8 wherein said steps are performed on both of said free ends substantially simultaneously.

10. A method according to claim 6 wherein heating of said free end is accomplished by the establishment of an electrical arc at said free end.

11. Apparatus according to claim 1 wherein said gripping means substantially encircles said filament when gripping the latter.

12. A method according to claim 6 including substantially encircling said one of said filaments with said heat conductive means.

* * * * *